United States Patent
Speth et al.

[11] 3,902,109
[45] Aug. 26, 1975

[54] DEVICE FOR THE REGULATION OF A CONVERTER OVER A FULL RANGE OF OPERATION INCLUDING OPERATION IN A PULSATING MODE

[75] Inventors: Winfried Speth; Klaus Böhm; Walter Dreiseitl, all of Erlangen, Germany

[73] Assignee: Siemens Aktiengesellschaft, Munich, Germany

[22] Filed: July 25, 1974

[21] Appl. No.: 491,664

[30] Foreign Application Priority Data
July 30, 1973 Germany............................ 2338630

[52] U.S. Cl. .................. 321/18; 318/341; 318/345
[51] Int. Cl. ............................................ H02p 13/24
[58] Field of Search .................. 321/5, 18, 40, 47; 318/332, 341, 345, 227, 326, 327

[56] References Cited
UNITED STATES PATENTS
| | | | |
|---|---|---|---|
| 3,413,534 | 11/1968 | Stringer | 318/326 |
| 3,612,971 | 10/1971 | Blaschke | 318/227 |
| 3,649,895 | 3/1972 | Joslyn | 318/345 |
| 3,746,966 | 7/1973 | Torok et al. | 321/5 |

*Primary Examiner*—William H. Beha, Jr.
*Attorney, Agent, or Firm*—Kenyon, Kenyon Reilly Carr & Chapin

[57] ABSTRACT

A device permitting optimization of a current controller for a converter such that it operates equally well both in an operating range where a continuous current is provided and an intermittent current with gaps between current pulses is provided, in which a time constant element and a proportional element with variable gain are inserted in the control loop and means for activating these elements when operating in a mode where gaps are present between pulses provided.

18 Claims, 10 Drawing Figures

CURRENT CONTROL

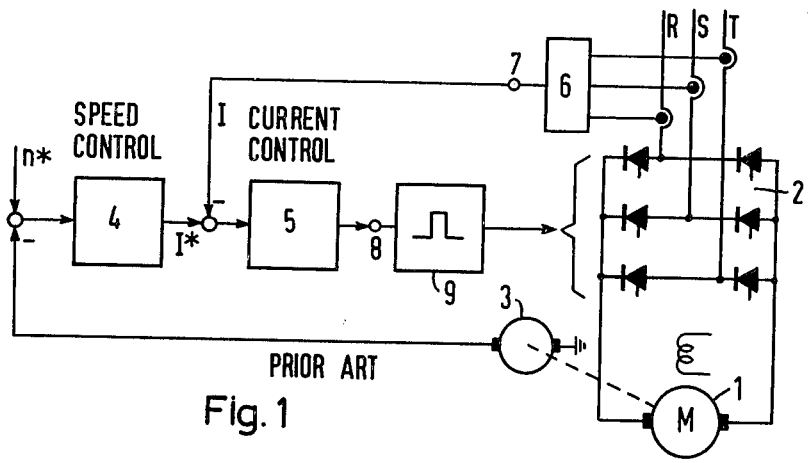
Fig. 1
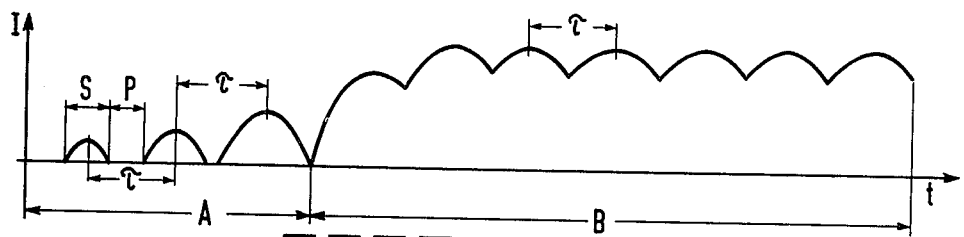
Fig. 2
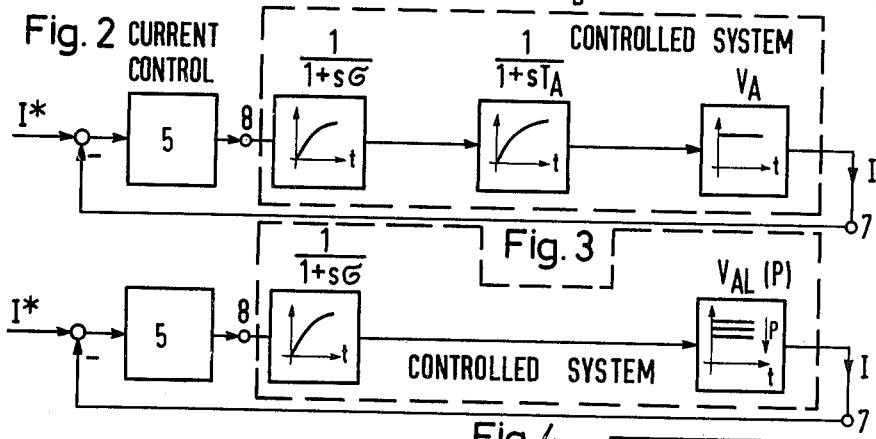
Fig. 3
Fig. 4
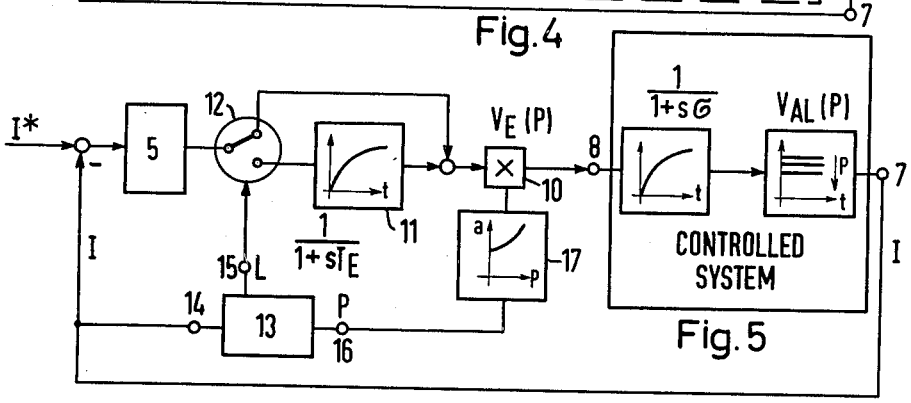
Fig. 5

3,902,109

DEVICE FOR THE REGULATION OF A CONVERTER OVER A FULL RANGE OF OPERATION INCLUDING OPERATION IN A PULSATING MODE

BACKGROUND OF THE INVENTION

This invention relates to the current control of converters with current dependent control loop parameter variation in general and more particularly to a device which permits optimization of the current controller under all conditions of operation including the condition in which gaps exist between pulses.

Control devices for converters which permit operation both in an intermittent range where gap intervals occur between pulses, hereinafter referred to as a gapping range, and in a range of continuous operation, where no gaps exist, have been developed. Typical is the device disclosed in German Auslegeschrift No. 1,957,599 which comprises a proportional integral control which, by means of a switching arrangement, is switched during intervals in the gapping range, such that it exhibits a purely integrating characteristic. This prior art device permits equally good control during the non-gapping range as well as during the gapping range through the use of a proportional integral controller with an integral action time corresponding to one of the time constants of the load circuit. Although this circuit does operate to provide the desired function it depends on changes in the controller characteristics to do so. The object of the present invention, however, is to achieve the same objective independent of the type and parameter settings of the current controller.

SUMMARY OF THE INVENTION

The present invention solves this problem in a device of the general type described above by providing in the control loop, in addition to the current controller, a proportional element having a variable gain in the gapping range and a time constant element along with means to activate these elements when in the gapping range. The basic concept behind the present invention is not to adapt the controller, through switching of its parameters, to the control system which is changing within the gapping range but instead to preserve the controller as it is and to change the structure of the controlled system within the gapping range such as to compensate for control system variations. Through these measures the control can be optimized, independent of the type of the control used, for dynamic control conditions both inside and outside the gapping range.

BRIEF DESCRIPTION OF THE DRAWINGS

FIG. 1 is a block diagram illustrating a typical application of a current controlled converter used for the speed control of a DC motor supplied through a converted control element from a three-phase system.

FIG. 2 is a wave-form diagram illustrating gapping and non-gapping ranges.

FIG. 3 is a functional block diagram illustrating the current control circuit characteristics in the non-gapping range.

FIG. 4 illustrates the same for the gapping range.

FIG. 5 is a block diagram functionally illustrating the present invention.

DETAILED DESCRIPTION OF THE PREFERRED EMBODIMENT

Figure 6:
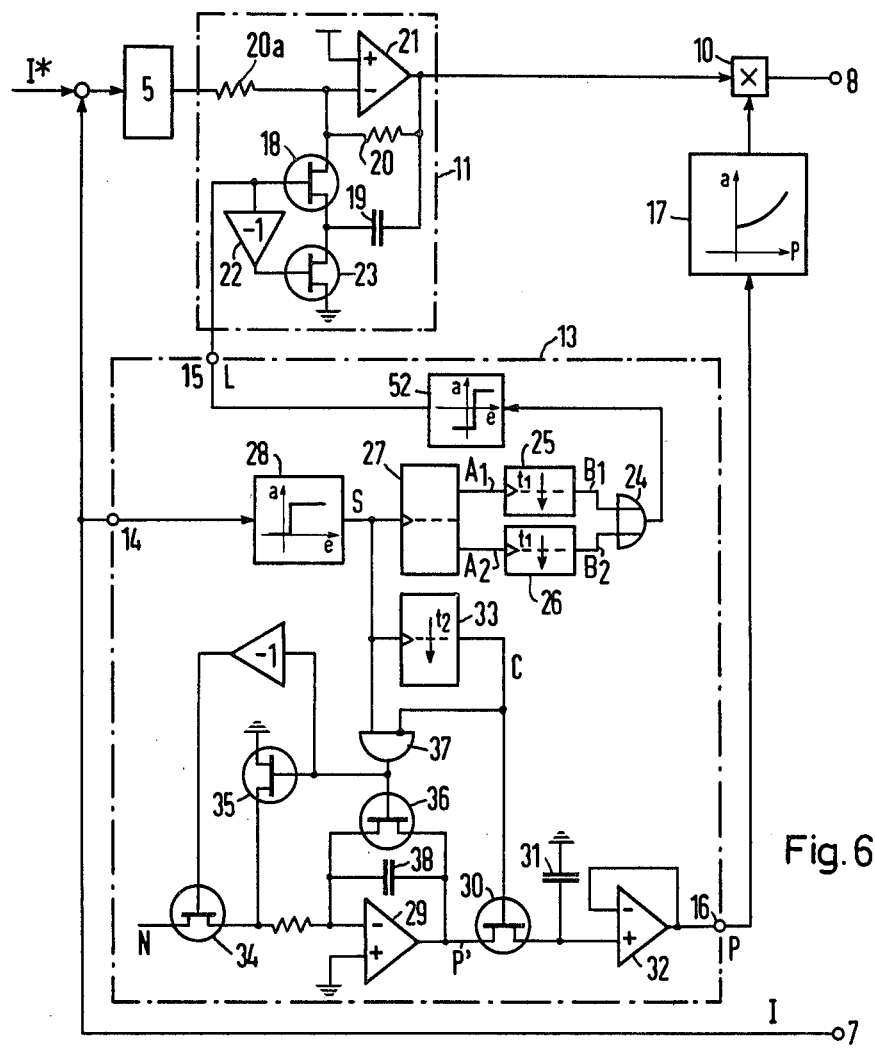
FIG. 6 is a circuit diagram illustrating a first embodiment of the present invention.

FIG. 1 shows in block diagram form a typical application of a current controlled converter. Shown is a DC motor 1 supplied with direct current through a converter control element 2 from a three-phase system having phases R, S and T. The motor speed is measured by a tachometer generator 3, the output of which is supplied to the input summing junction of a speed control 4. Here it is compared with a desired speed N* to cause adjustment of the control 4 to provide an output I* representing a desired current for maintaining that speed. This serves as the reference value at the summing junction at the input of a current controller 5 where it is compared with an actual value of current provided from the output terminal 7 of a current-measuring means 6. As illustrated the current-measuring means 6 obtains inputs from current transformers in each of the three phases R, S and T. The current control 5 provides its output to the input terminal 8 of a control unit 9 which generates the necessary firing pulse for the thyristors which make up the converter 2. As noted above, this is a conventional arrangement well known to those skilled in the art and its description is provided herein only by way of background information.

FIG. 2 is a wave form diagram illustrating the different operating conditions in the converter 2. At the portion of the wave form diagram designated A the converter is operating in a gapping range where there are gaps existing between the current pulses. That is to say the periods of current flow designated S are separated by current gaps indicated as P. In well known fashion this gapping takes place in dependence on the time constant of the load circuit when below a certain current level. In a steady state condition, i.e., for equal peak values of individual current pulses, the sum of a current flow interval S and a following currentless interval P is equal to the period τ of the pulse frequency of the converter current. For a six-pulse circuit such as that shown on FIG. 1 T would amount to one-sixth of the period of the three-phase system. on FIG. 2, B designates the non-gapping or continuous range where gaps do not exist between current pulses.

FIG. 3 illustrates the functional structure of the system when operating in the non-gapping range. Identical reference numerals to those in FIG. 1 are used herein and throughout the rest of the specification to indicate identical items. The controlled system between the terminals 8 and 7 is modeled by the three illustrated blocks. Shown are two first order delay elements with time constants σ and $T_A$ where σ is relatively small compared to $T_A$ and includes the dead time of the control unit 9 plus additional smaller time constants resident in the control circuit. $T_A$ is the time constant of the load circuit which for the example in FIG. 1 is given by the ratio of the armature circuit inductance and the armature circuit resistance. The proportional element with the gain $V_A$ represents the armature circuit gain and is defined with the motor standing still for the non-gapping range by the expression:

$$V_A = \frac{U_A}{I_A} \cdot R_A$$

FIG. 4 is a similar representation of the control system in the gapping range. The differences are evident. The armature circuit time constant $T_A$ from a control point of view no longer has an effect and the armature current gain $V_{AL}$ decreases with the increasing duration of currentless pauses. Thus, a current controller 5 which is optimized according to the criteria for non-gapping operation as illustrated by FIG. 3 would then find a totally changed control system when in the gapping range illustrated by FIG. 4 and from a dynamic control point of view no longer provides the same performance during gapping operation.

FIG. 5 is a diagram similar to those of FIGS. 3 and 4 illustrating the elements of the present invention included in the control loop. There is inserted into the control loop a proportional element 10 which advantageously is a multiplier. Multiplier 10 has a gain $V_{E(P)}$ which can be adjusted in the gapping range. Also included is a first order delay element 11 with a time constant $T_E$ which is capable of being activated in gapping range, through the closure of switch 12, to cause the output of the current controller 5 to be passed through the delay element 11. During non-gapping operation the element 11 is bypassed with the switch in the position shown on the figure. In that case the output of the current controller 5 is fed directly to the multiplier 10. In addition, a gap current detection device 13 is provided which has its input terminal 14 coupled to the actual value of the current obtained from the terminal 7. This detection device is arranged to provide at its output terminal 15 a continuous signal L when within the gap range and also provides at its output terminal 16 a DC voltage signal P proportional to the duration of the currentless intervals. The output terminal 16 is connected to the input of a function generator 17. The function provided as an output at function generator 17 corresponds, except for a constant factor, to the inverse value of the function according to which the gain $V_{AL}$ in the load circuit changes in dependence on the pulse duration P. In this manner the product of the gains of element 10 the proportional element of gain $V_{AL}$ will always result in a constant value of gain, and variation of the load circuit which occurs during the gapping range will thereby be compensated. By making the time constant $T_E$ of delay element 11 equal to the time constant $T_A$ of the converter supplied load circuit the current controller 5 operates, in the gapping range as well as in the non-gapping range of the converter, into a controlled system with control loop parameters which on the whole remain unchanged.

FIG. 6 is a circuit diagram illustrating the implementation of the control system shown functionally on FIG. 5. As shown, the delay element 11 comprises an amplifier 21 having in its feedback path a resistor 20 and a capacitor 19. Capacitor 19 is capable of being switched in and out of the feedback path through the use of a field effect transistor 18. Field effect transistor 18 is controlled by a signal L available at terminal 15 of the gap current detection device 13. When a signal L is present, indicating gapping operations, the field effect transistor 18 is turned on to place the capacitor 19 in the feedback path. In the non-gapping range, the signal L no longer is present and the field effect transistor 18 is cut off. Through an inverting amplifier 22 a field effect transistor 23 is turned on so that the capacitor 19 is maintained at zero potential. During operation in this manner the amplifier functions as purely proportional amplifier with a gain of one, i.e., the resistor 20 and the input resistor 20a are of equal value.

The gap detection device 13 which forms the signal L, along with a signal P, obtains as an input at terminal 14 a value proportioned to the actual value of the current I, obtained from terminal 7 described above in connection with FIG. 1. The actual value representing current is provided to a comparator 28. Comparator 28 will provide an output at one level when the current is zero during a gap and at a second level when a current is detected. The output S of the comparator 28 is provided as a trigger input to a flip-flop 27. Flip-flop 27 is adapted to trigger on the falling edge of the pulse. Thus, each time a gap is encountered the flip-flop 27 changes state. The two outputs of the flip-flops are designated A1 and A2 and are provided as respective inputs to monostable multi-vibrators 25 and 26. The monostables 25 and 26 have their outputs provided to an Or gate 24. Operation of this portion of the circuit can best be understood by reference to FIG. 7. Shown thereon is the current signal I and below it the response of the comparator 28 having the outputs signal S. As illustrated, each time the signal S goes low the flip-flop 27 triggers and the signals A1 and A2 change state. As illustrated, the monostables 25 and 26 are caused to fire on the rising edge of the corresponding flip-flop output. Thus, as the signal A2 goes high the monostable 26 fires to output a signal B2. Similarly, when the signal A1 from flip-flop 27 goes high, the monostables 25 fires to output the pulse B1. The two monostables flip-flops 25 and 26 have a relaxation time $t_1$ which is somewhat greater than the cycle time $\tau$ of the pulse frequency of the converter current. As a result, when in a gapping range one of the signals B1 or B2 will always be present. These two signals as noted above are Ored in an Or gate 24 which will thus always have an output when in the gapping range. This signal is then provided through a signal-shaping device 52 such as a comparator or Schmitt trigger to provide the output signal L at terminal 15. As illustrated on FIG. 7 the output signal L will always be present during the gapping range. Thus, whenever gapping is present the continuous signal L turns on the field effect transistor 18 in the delay circuit 11.

Figure 7:
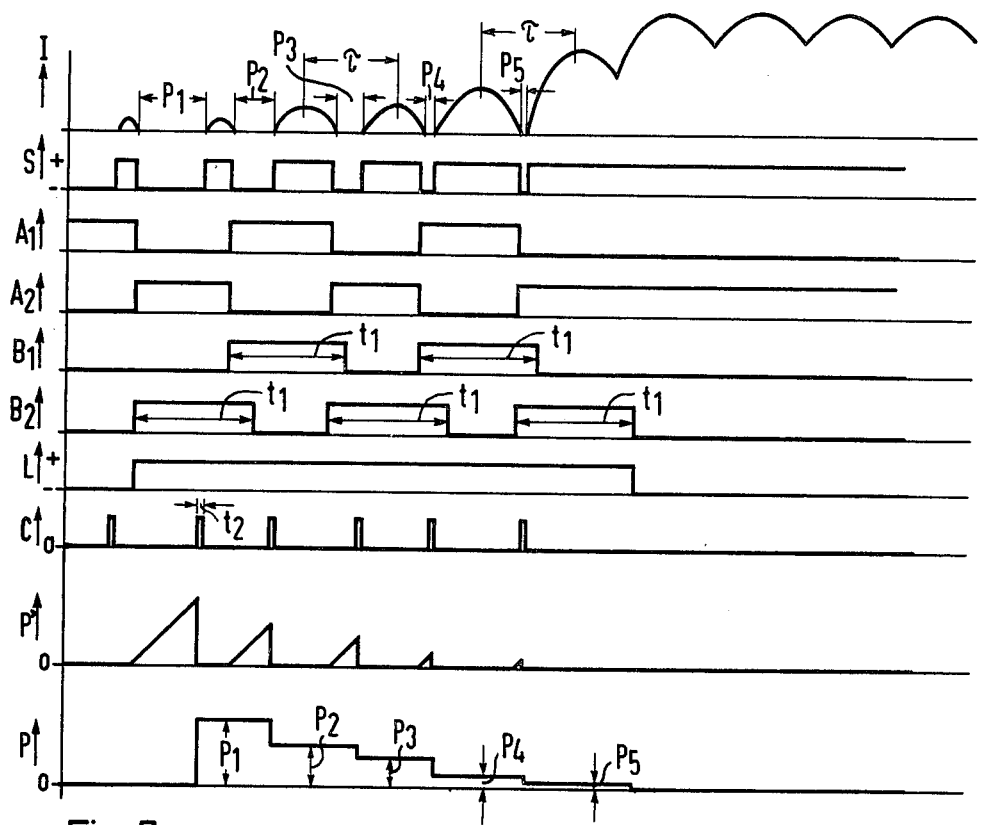
FIG. 7 is a wave form diagram helpful in understanding the operation of FIG. 6.

The remainder of the gap current detection device 13 is used for generating the output signal P at terminal 16. As is evident from the discussion above, the output P must be a voltage proportional to the pulse gap interval. The circuit includes an integrator comprising operational amplifier 29 with a capacitor 38 in its feedback path. Operational amplifier 29 has as an input a constant voltage N provided through a field effect transistor 34 and a conventional input resistor. The input resistor is also coupled to ground through a field effect transistor 35. A further field effect transistor 36 capable of shorting the capacitor 36 is provided. The amplifier output designated P' is provided through a further field effect transistor 30 to the input of a sample and hold circuit comprising a capacitor 31 coupled between the input of an amplifier 32 and ground. Amplifier 32 has the input coupled to its non-inverting terminal with feedback to its inverting terminal. Capacitor 31 provides means for storing an indication of the pulse gap length with the amplifier 32 being used to provide a high impedance input to avoid draining the capacitor. Operation of the circuit can best be seen again with reference to FIG. 7. A further monostable multi-vibrator 33 responsive to the rising edges of the signal S from the comparator 28 is provided. The monostable 33 has a relatively small relaxation time $t_2$. The output of monostable 33 indicated as C on both FIGS. 6 and 7 is provided as an inverted input to an And gate 37. And gate 37 has as its second input the output signal S from the comparator 28. At the beginning of the first gap designated $P_1$ the signal S will be low as will the output C of the monostable 33. This will result in And gate 37 having a "0" input from the comparator 28, and, after inversion, a "1" input from the monostable 33. As a result it will have a 0 output and the field effect transistors 35 and 36 will be turned off. This 0 output signal is inverted through an inverter causing the field effect transistor 34 to be turned on and the input voltage N to be provided to the integrator made up of amplifier 29 and feedback capacitor 38. Its output P' will thus increase as shown on FIG. 7. At the end of the gap the monostable 33 will be fired outputting the short pulse C of length $t_2$. This will turn on the field effect transistor 30 causing the output voltage of the amplifier 29 to be stored by the capacitor 31. During this time the And gate 37 will remain disabled because of the 1 output of the monostable 33 being inverted to a 0 level at its input. Thus, the field effect transistors 36 and 35 will remain off and the field effect transistor 34 on. This prevents the discharge of the voltage of the integrator while it is being transferred to the storage circuit. After the short time $t_2$, however, the And gate 37 will have two 1 inputs and will provide a 1 output to turn on the field effect transistors 35 and 36 and turn off the field effect transistor 34. The input to the amplifier 29 will be grounded through the field effect transistor 35 and its capacitor will be discharged through the field effect transistor 36 thereby resetting the integrator to zero. Similar operation occurs for the gaps $P_2$, $P_2$, $P_4$ and $P_4$ with the level the voltage reaches during the integration decreasing as the gap decreases. This is illustrated by the voltage P', and the final output voltage P which is the peak sampled value of the wave form P'. Thus, there will be provided as an output at terminal 16 a voltage proportional to the gap spacing. As indicated above, this output P is provided as an input to a function generator 17 which supplies the second input to multiplier 10 to obtain the variable gain required for proper operation of the circuit.

Figure 8:
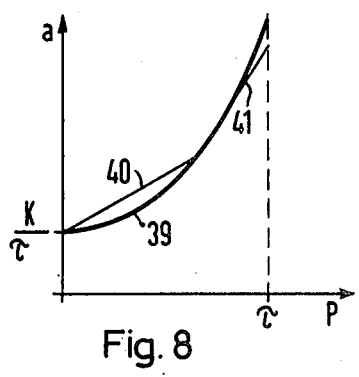
FIG. 8 is a graph illustrating the relationship between gain and time constant.

FIG. 8 is a curve illustrating the desired relationship between the output variable $a$ and the input variable P which must be provided by the function generator 17. Analytically, the function shown on FIG. 8 is prepresented by the following equation:

$$a = \frac{K}{(\tau - P)^2}$$

where $\tau$ is the cycle time of the pulse frequency of the current, P is the duration of the current pauses and K is a constant. It has been discovered that this function is particularly well-suited for the compensation of the control system gain which varies in the gap range. This function can be obtained in a well-known manner, for example by using an operational amplifiers having in its input circuit or negative feedback circuit biased threshold diodes which become conducting one by one in dependence on the applied input voltage and which thus change the gain of the operation amplifier in the desired manner. In well-known fashion, the greater the number of diodes used the more exactly the desired function can be simulated. However, for many cases it has been found sufficient to approximate the function of FIG. 8 using only one or two straight line sections such as those designated on FIG. 8 as 40 and 41. Operation in this manner requires only one or two threshold diodes. A more detailed description of the construction of function generators of this nature is given in the "Applications Manual for Operational Amplifiers for Modeling, Measuring, Manipulating and Much Else" published by Philbrick/Nexus Research, 1968, e.g., see paragraph II.23 on page 54. It should also be noted that the current controller 5 and speed controller 4 referred to above may simply comprise integrators such as those described in the same publication on page 44. The multiplier 10 can of course simply be an analog multiplier of the type commercially available.

Figure 9:
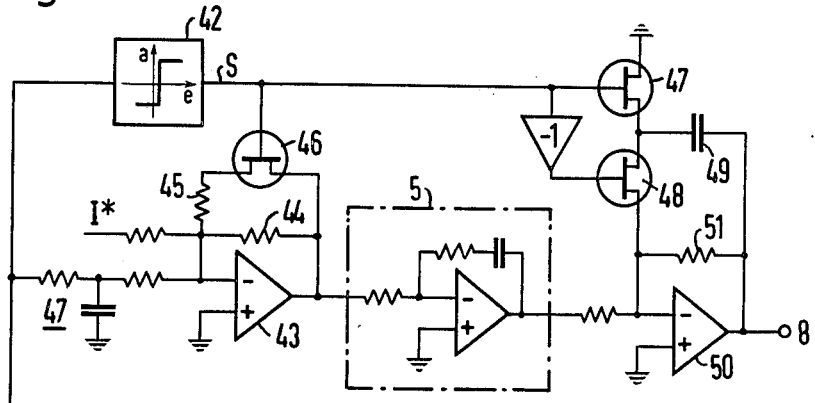
FIG. 9 illustrates an alternate embodiment of the present invention.

FIG. 9 illustrates an alternate embodiment of the invention in which activation of the delay element and change of gain in the gap range takes place in a more or less on-off switching mode for the duration of the respective current pause. The proportional element having variable gain, designated on FIGS. 5 and 6 as 10, in the embodiment of FIG. 9 comprises an amplifier 43 which has in its negative feedback path two resistors 44 and 45 with the latter resistor 45 having a field effect transistor 46 in series therewith to permit switching it in and out. Through this measure the proportional gain of the amplifier 43 is increased when the field effect transistor 46 cut off. At the inverted input of the summing amplifier 43 the reference current I* is provided through a first input summing resistor. The actual value I is provided through an RC smoothing circuit 47 as a second input. The use of the smoothing element 47 in the input of the amplifier 43 provides, in addition to smoothing of the control process, the ability to realize even extremely small actual values of current. As shown, the output of the amplifier 43 is provided as the input to the current controller 5 which in the illustrated embodiment comprises simply an operation amplifier integrator. Its output is provided to the delay circuit which includes the amplifier 50 and its associated feedback path. The arrangement here is essentially the same as that shown for the amplifier 21 on FIG. 6. For the case of operation in the non-gapping range, only the feedback resistor 51 is in the circuit causing the unity gain operation of the amplifier 50 in a linear proportional manner. During gapping operation the field effect transistor 48 is turned on to place the capacitor 49 in the feedback path. The field effect transistor 47 is provided to ground the capacitor 49 when in the non-gapping range. Control of the field effect transistors 46, 47 and 48 is by means of a pulse shaping circuit 42. This corresponds generally to the pulse shaper 52 of FIG. 6. However, in the embodiment of FIG. 9 the additional circuits are not used with the output of the pulse shaper 42 being used directly to control the field effect transistors. Discontinuities in the circuit are prevented through the use of the field effect transistor 47 which prevents any such discontinuities resulting when the capacitor 49 is connected into the circuit and by the inclusion of the current controller 5 between the proportional element 43 and the delay element 50. With the arrangement of FIG. 9 during each current pause the field effect transistor 46 is turned off to remove the feedback resistor 45 from the feedback circuit of amplifier 43 to thereby increase its gain. At the same time the field effect transistor 48 is turned on and the field effect transistor 47 off to connect the capacitor 49 into the feedback path of the amplifier 50 to insert the required delay element. In this embodiment where the gain and time characteristics are changed in rhythm with the current pauses it has been recognized as advantageous to select a time constant for the delay element which is approximately equal to three times the cycle time of the pulse frequency and to make the gain of the proportional element during the current pause approximately ten times greater than its proportional gain during the current-conducting intervals.

Figure 10:
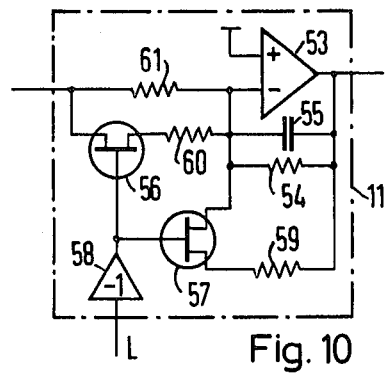
FIG. 10 is a circuit diagram illustrating an alternate embodiment of another portion of FIG. 6.

FIG. 10 shows an alternate embodiment for the delay element 11 which can be activated during the gapping range. The illustrated circuit allows this to be accomplished in a relatively simple manner so that when it is disconnected at the start of the non-gapping range jumps in its output voltage are avoided. With an arrangement such as that of FIG. 6 such jumps can cause disturbances. The delay element includes an amplifier 53 having negative feedback through a resistor 54 and capacitor 55. A field effect transistor 57 is provided which couples a second resistor 59 in parallel with the resistor 54 in the feedback path. An input resistor 61 is provided with a field effect transistor and resistor 60 in parallel therewith. At the beginning of the non-gapping range the field effect transistors 56 and 57, due to the negative potential of the signal L are turned on by the output signal of the inverting amplifier 58 so that resistors 59 and 60 are connected in parallel respectively in the negative feedback circuit and in the input circuit. The parallel connected resistors 59 and 60 are quite a bit smaller than the resistors 61 and 54. For example, they may be 1/100 the size respectively of the resistors 54 and 61 to cause the time constant of the delay element to become negligibly small during the non-gapping range, but with unchanged proportional amplifications, in comparison to the gapping range during which the resistors 59 and 60 are not effective.

Thus, an improved device for optimizing the control loop of a converter so that it operates equally well both in gapping ranges and non-gapping ranges without requiring changes in the controller has been shown. Although specific embodiments have been illustrated and described it will be obvious to those skilled in the art the various modifications may be made without departing from the spirit of the invention which is intended to be limited solely by the appended claims.

What is claimed is:

1. In a converter having current dependent control loop parameter variations and including a current controller, a device for gap current adapted current control comprising:
   a. a proportional element having variable gain and a delay element inserted in the control loop; and
   b. means for varying the gain of said proportional element and for activating said delay element in the gapping range.

2. A device according to claim 1 wherein said variable gain proportional element comprises a multiplier and wherein said means for varying said gain comprise means for providing a multiplification factor to said multiplier which multiplication factor is dependent on the duration of current pauses.

3. A device according to claim 2 wherein said means for providing a multiplication factor comprise:
   a. means for developing an analog output signal proportional to the current pause length; and
   b. a function generator having said analog output signal as an input and providing its output to said multiplier.

4. A device according to claim 3 wherein said function generator approximately simulates the function $$a = (\frac{K}{\tau} - P)^2$$

where $t$ is the period of the pulse frequency of the current, $P$ is the duration of the current pauses and $K$ a constant.

5. A device according to claim 3 wherein said means for providing an analog output signal comprise:
   a. an integrator having as an input a constant voltage;
   b. storage means providing said analog output signal; and
   c. means for transferring the output of said integrator to said storage and for resetting said integrator at the beginning of each current conducting interval.

6. A device according to claim 5 wherein said means for resetting said integrator and providing said integrator output to said storage means comprise:
   a. at least first and second electronic switches; and
   b. means having as an input a signal proportional to actual current and providing its output as a control input to said electronic switches.

7. A device according to claim 1 wherein said delay element comprises:
   a. a proportional amplifier having a negative feedback through a feedback resistor;
   b. a feedback capacitor; and
   c. a third electronic switch for coupling said capacitor in and out of a location in parallel with said feedback resistor.

8. A device according to claim 7 wherein said means for activating said delay element comprise means for activating said third electronic switch comprising:
   a. first and second monostable multi-vibrators having a relaxation time greater than the cycle time of the pulse frequency;
   b. an Or gate having as inputs the output of said monostables and havings its output coupled to said third electronic switch; and
   c. means to alternately trigger said first and second monostables at the end of each current pulse.

9. A device according to claim 1 wherein the time constant of said delay element is at most equal to the time constant of the load circuit supplied by the converter.

10. A device according to claim 1 wherein said proportional element having variable gain comprises an amplifier and means to change the gain of said amplifier.

11. A device according to claim 10 wherein said variable amplifier comprises a first amplifier having a first negative feedback resistor, said means for changing gain comprise a second feedback resistor and a first electronic switch for selectively connecting said second resistor in parallel with said first resistor and wherein said delay element comprises a second amplifier having a third negative feedback resistor and having a capacitor and a second electronic switch in series in parallel to said third resistor and wherein said means for activating said time delay element and varying said gain comprise means having as an input a signal proportional to current and providing its output to control said electronic switches in dependence on the presence or absence of a current signal.

12. A device according to claim 11 wherein a further electronic switch is provided coupling one electrode of said capacitor to ground, said switch being coupled to said means to control so as to be turned on when said second switch is turned off.

13. A device according to claim 11 wherein the current controller comprises a proportional integral controller and wherein said controller is coupled between said variable gain amplifier and said delay element.

14. A device according to claim 13 and further including a smoothing element coupling said signal proportional to the actual value of the current as an input to said first amplifier.

15. A device according to claim 11 wherein said electronic switches are field effect transistors.

16. A device according to claim 10 wherein said means for changing gain comprise means to cause said amplifier to have a gain during current pauses which is one order of magnitude greater than the gain during current conducting intervals.

17. A device according to claim 10 wherein said delay element has a time constant approximately equal to three times the period of the pulse frequency of the current.

18. A device according to claim 1 wherein said delay element comprises:
 a. a proportional amplifier;
 b. a negative feedback capacitor coupled to said amplifier;
 c. a first negative feedback resistor coupled in parallel with said capacitor;
 d. a first input resistor coupling the input of said amplifier to its inverting terminal;
 e. a first series circuit comprising an electronic switch and a resistor in parallel with said negative feedback resistor;
 f. a second series combination of a resistor and electronic switch in parallel with said input resistor; and
 g. wherein the resistors in said first and second series circuits are proportional to the resistors which they parallel and are selected to provide a time constant for the delay element which is negligibly small when said resistors are coupled in parallel by activation of their associated electronic switches.

* * * * *

UNITED STATES PATENT AND TRADEMARK OFFICE
CERTIFICATE OF CORRECTION

PATENT NO. : 3,902,109
DATED : August 26, 1975
INVENTOR(S) : Winfried Speth et al It is certified that error appears in the above-identified patent and that said Letters Patent are hereby corrected as shown below:

Column 8, line 15 (claim 4) - the equation should read:

$$a = \frac{K}{(\tau-P)^2}$$

Column 8, line 18 "t" should read "$\tau$".

Signed and Sealed this

Seventeenth Day of May 1977

[SEAL]

Attest:

RUTH C. MASON
Attesting Officer

C. MARSHALL DANN
Commissioner of Patents and Trademarks